A. Fisher,
Pump Lift,
Nº 76,318. Patented Apr. 7, 1868.
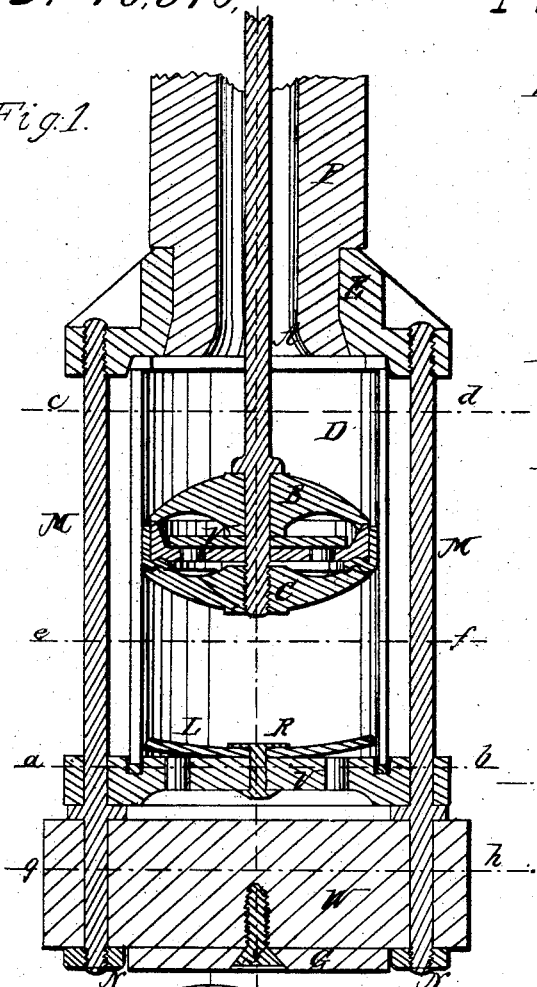
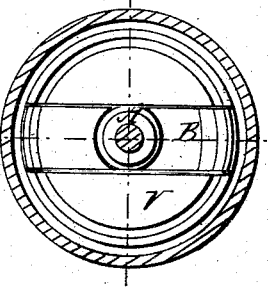
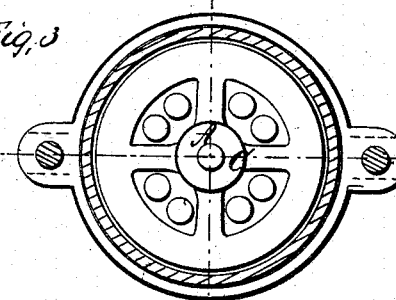
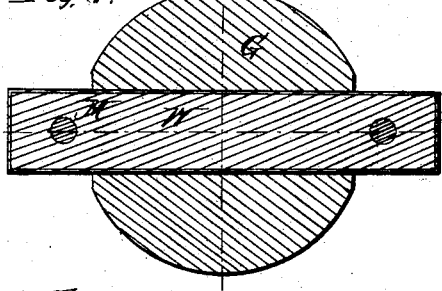
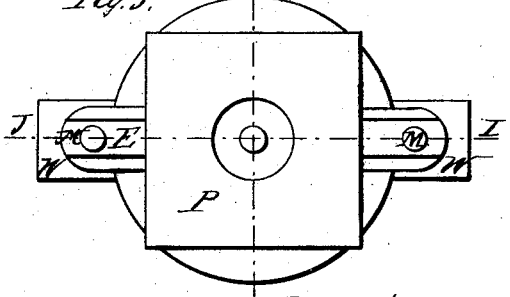
Witnesses;
Albt Lull
Geo. Yeater Sawyer Jr.
Inventor;
A. Goel Fisher

United States Patent Office.

ALFORD FISHER, OF NASHUA, NEW HAMPSHIRE.

*Letters Patent No. 76,318, dated April 7, 1868.*

IMPROVEMENT IN PUMPS.

*The Schedule referred to in these Letters Patent and making part of the same.*

TO ALL WHOM IT MAY CONCERN:

Be it known that I, ALFORD FISHER, of Nashua, in the county of Hillsborough, and State of New Hampshire, have invented a new and useful Improvement in Pumps; and I hereby declare the following to be a full, clear, and exact description thereof, reference being had to the accompanying drawings, and to the letters of reference marked thereon.

Figure 1 shows a section of the glass cylinder-plunger, with valve-packing and bottom strainer-piece; also the manner of fastening the valve.

Figure 2 shows my independent bail, B, flange-cap C, fig. 1, made as hereafter described, and the fastening-rods for cylinder M M.

In pumps heretofore made, when the glass cylinder has been used, the plunger has been fastened as follows: The rod is screwed and fastened immediately into and through the plunger, and is used to hold both valve and packing in the plunger—the valve, by a nut screwed on the rod, and resting on the upper face of the valve; the packing, by means of this and another nut at the bottom of plunger; the parts of the box are held or completed together. The consequence of this is, the rod sometimes works loose, and the plunger is raised and lowered in an inclined position, or canted in one way or another, and the glass cylinder, by this means, is broken. Or the rod is fastened to a bail on the box, and the valve secured by a short screw, having a nut at either end. The consequence of this is, the bail takes up so much of space inside of box that it leaves but a small passage for water. The valve inside of plunger has to be cut around the bail in such a manner as to leave long corners, that sometimes press down through the hole in the plunger-box when it is raised. The short screw, with nut at either end, is very inconvenient to get at. There is so little space under the bail that there is no chance to hold or turn the nut. They are also very liable to work loose, and let the packing drop down, so the pump will not work.

Greater security and simplicity are obtained by the use of my independent bail with hub projecting down inside of plunger-box, holding the valve in its place, the ends of bail resting on the rim of box, rod A passing through bail B and valve F, and secured directly into hub on flange-cap C. The flange-cap has formerly been made with rim and a straight cross-bar. The consequence of this was to sometimes break the cross-bar, if not turned sufficiently to hold the packing in its proper place. I obviate this by making a flange-cap with hub in centre, secured directly on rod A, with four arms running from hub to rim in a bracing position, as shown in plunger C, and, by turning up the cap (rim resting on packing) on the under side of box, and compressing the whole together against collar on rod A in such a manner that it is impossible to work loose.

The glass cylinder has heretofore been held and secured by reason of rods passing through ears attached to heads at the top and bottom of the cylinder, and having nuts at either end thereof, or hooks at one end of rods, to hook on bottom piece, and nut at the other, neither being sufficient to hold the cylinder in its proper place without breaking hook or ears.

Greater security, strength, and simplicity are obtained by passing the rods (solid heads) through the bottom piece, and screwed direct into neck-piece, with four solid braces projecting out from neck-piece, the rods passing between them, as shown in fig. 1, E, there not being a nut to work loose in the pump. Fig. 1 shows the rods and neck-pieces as I construct them.

Having thus described these several improvements, what I claim as my invention, and desire to secure by Letters Patent, is—

The described arrangement and combination of the rod A, independent bail B, the flange-cap C, fastening-rods M M', and neck-piece D.

ALFORD FISHER.

Witnesses:
THOMAS PEARSON,
D. A. G. WARNER.